US010405355B2

(12) United States Patent
Lin et al.

(10) Patent No.: US 10,405,355 B2
(45) Date of Patent: Sep. 3, 2019

(54) LTE RACH PROCEDURE ENHANCEMENT

(71) Applicant: MEDIATEK INC., Hsinchu (TW)

(72) Inventors: Shiang-Jiun Lin, Hsinchu (TW);
Pei-Kai Liao, Nantou County (TW);
Chien-Hwa Hwang, Hsinchu County (TW)

(73) Assignee: HFI Innovation INC., HsinChu (TW)

( * ) Notice: Subject to any disclaimer, the term of this patent is extended or adjusted under 35 U.S.C. 154(b) by 147 days.

(21) Appl. No.: 15/004,196

(22) Filed: Jan. 22, 2016

(65) Prior Publication Data

US 2016/0219624 A1 Jul. 28, 2016

Related U.S. Application Data

(60) Provisional application No. 62/106,846, filed on Jan. 23, 2015.

(51) Int. Cl.
*H04W 74/08* (2009.01)
*H04W 74/00* (2009.01)
(Continued)

(52) U.S. Cl.
CPC ................ *H04W 74/085* (2013.01)

(58) Field of Classification Search
None
See application file for complete search history.

(56) References Cited

U.S. PATENT DOCUMENTS

2009/0259910 A1  10/2009  Lee et al. .............. 714/748
2011/0243080 A1  10/2011  Chen et al. ............ 370/329
(Continued)

FOREIGN PATENT DOCUMENTS

CN   101695196 A   10/2009
CN   102612852 A    3/2010
(Continued)

OTHER PUBLICATIONS

English translation of System Messages and Random Access Process in LTE, cited on IDS dated Jul. 3, 2016, retrieved from baidu.com, Sep. 29, 2013, pp. 1-12.*
(Continued)

*Primary Examiner* — Jason E Mattis
*Assistant Examiner* — Hong Shao
(74) *Attorney, Agent, or Firm* — Imperium Patent Works; Helen Mao

(57) ABSTRACT

Methods and apparatus are provided for Msg3 collision resolutions. In one embodiment, the UE obtains a set of DMRS seeds and randomly selecting one to generate a DMRS sequence for the Msg3. The set of DMRS seeds is either generated based on a received cell-specific parameter or are received from the network. In another embodiment, the eNB, upon detecting the collision in Msg3, indicates a lowered MCS level for the Msg3 transmission in the RAR after the preamble detection. In another embodiment, the early termination of Msg3 transmission is used upon determining the collision of Msg3. In one embodiment, the eNB responds an ACK to a failed Msg3 to suspend the retransmission of the Msg3. In another embodiment, the eNB sends a flag to cancel the mac-ContentionResolutionTimer and terminate the Msg3 transmission. The termination indication is either embedded in the acknowledgement signaling or sent through PDCCH signaling.

21 Claims, 8 Drawing Sheets

(51) Int. Cl.
*H04W 72/12* (2009.01)
*H04W 72/14* (2009.01)

(56) References Cited

U.S. PATENT DOCUMENTS

| | | | |
|---|---|---|---|
| 2011/0299415 A1* | 12/2011 | He | H04W 74/0833 370/252 |
| 2012/0044816 A1 | 2/2012 | Ratasuk et al. | 370/252 |
| 2012/0127930 A1 | 5/2012 | Nguyen et al. | 370/329 |
| 2012/0236816 A1 | 9/2012 | Park et al. | 370/329 |
| 2012/0287877 A1 | 11/2012 | Han et al. | 370/329 |
| 2013/0102320 A1 | 4/2013 | Suzuki et al. | 455/452.1 |
| 2013/0287064 A1* | 10/2013 | Seo | H04J 13/18 375/144 |
| 2014/0071936 A1 | 3/2014 | Zhang et al. | 370/330 |
| 2014/0169323 A1 | 6/2014 | Park et al. | 370/329 |
| 2014/0177491 A1* | 6/2014 | Hao | H04W 72/1278 370/280 |
| 2015/0215881 A1 | 7/2015 | Parkvall et al. | 370/350 |
| 2015/0282214 A1 | 10/2015 | Lee et al. | 370/329 |
| 2015/0365976 A1* | 12/2015 | Lee | H04W 74/0833 455/422.1 |
| 2016/0183219 A1* | 6/2016 | Kim | H04W 72/0406 370/329 |

FOREIGN PATENT DOCUMENTS

| | | |
|---|---|---|
| CN | 103069913 A | 8/2010 |
| WO | WO2012071348 A1 | 11/2010 |
| WO | WO2014065593 A1 | 10/2012 |

OTHER PUBLICATIONS

International Search Report and Written Opinion of International Search Authority for PCT/CN2016/071954 dated Apr. 21, 2016 (11 pages).
International Search Report and Written Opinion of International Search Authority for PCT/CN2016/074660 dated May 17, 2016 (11 pages).
USPTO, Office Action for related U.S. Appl. No. 15/054,108 dated Sep. 7, 2017 (9 pages).
EPO, search report for the EP patent application 16739812.2 dated Feb. 14, 2018 (8 pages).
EPO, search report for the EP patent application 16754776.9 dated Feb. 5, 2018 (10 pages).
Kaijie Zhou et al., "Contention based access for machine-type communications over LTE", 2012 IEEE 75th Vehicular Technology Conference, Yokohama, Japan, May 6-9, 2012, pp. 1-5, *Section II: figures 3,4*.

* cited by examiner

LTE RACH PROCEDURE ENHANCEMENT

CROSS REFERENCE TO RELATED APPLICATIONS

This application claims priority under 35 U.S.C. § 119 from U.S. Provisional Application No. 62/106,846 entitled, "LTE RACH PROCEDURE ENHANCMENT" filed on Jan. 23, 2015; the subject matter of which is incorporated herein by reference.

TECHNICAL FIELD

The disclosed embodiments relate generally to wireless communication, and, more particularly, to LTE Random Access Channel (RACH) procedure enhancement.

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting massive machine communications increases exponentially. The probability that multiple devices choose the same preamble to perform the contention based random access channel (RACH) is higher than the current human type communications. If the preamble is detected in the eNB side, eNB will response an RAR (Random Access Response) with RAPID (Random Access Preamble ID) by using RA-RNTI indicating the UL grant. The UEs choosing the same RAPID will transmit their Message 3 (Msg3) in the same scheduled UL grant. The multiple devices will transmit Msg3 in the indicated UL grant in the RAR by using the same resource and the same demodulation reference signal (DMRS). When the eNB performs the channel estimation, it will see a composite channel from all transmitted UE. If the eNB applies the composite channel result to decode the UE specific Msg3 in the physical uplink shared channel (PUSCH), with high probability, the PUSCH cannot be decoded correctly.

When the preamble is detected by eNB, eNB will indicate a timing advance in RAR to a specific UE. All the UEs which are transmitted the same preamble ID and receive the same RAR will apply this timing advance (TA) to transmit their Msg3. Although the location of the UEs may be different, as long as the receiving of all Msg3 (TA and delay spread) is within cyclic prefix length at the eNB, the eNB will treat these signals the same as multipath phenomena. Since these Msg3 messages are carrying different contents, they will severely interfere with each other, such as co-channel interference.

If eNB cannot successfully decode Msg3, it will transmit NACK to the UEs. The UEs receive the NACK will re-transmit their redundancy version of Msg3s. In such case, with high probability, the transmission and re-transmission of Msg3 may collide until the maximum number of Msg3 transmission is reached. The UE waits for the expiration of the mac-ContentionResolutionTimer before it retries the preamble again. It is estimated that with the increasing number of UEs/devices in the wireless system, such as supporting machine type communications, the probably of Msg3 collision will be high.

Improvements and enhancements are needed for LTE RACH procedure enhancement.

SUMMARY

Methods and apparatus are provided for LTE RACH procedure enhancement. In one novel aspect, Msg3 collision resolutions are provided, including the DMRS randomization, the MCS level indication for Msg3, and the early termination of Msg3 transmission.

In one embodiment, DMRS randomization is used by the UE to reduce the probability that multiple UEs use the same DMRS for Msg3. The UE obtains a set of DMRS seeds and selects one from the set. The UE generates a DMRS sequence using the selected DMRS seed. The generated DMRS sequence is used for the Msg3. In one embodiment, the UE obtains a cell specific parameter from the network. The cell specific parameter can be obtained from SIB2. The UE uses the obtained cell specific parameter and applies a predefined rule to generate the set of DMRS seeds. In another embodiment, the set of DMRS seeds is sent to the UE by the network. The network can send the set of DMRS seeds in the system information message.

In another embodiment, the MCS level indication for Msg3 is implemented by the eNB. The eNB, upon detecting the collision in Msg3, indicates MCS level for the Msg3 transmission in the RAR after the preamble detection. The MCS level for Msg3 is lowered to provide the robustness of the detection probability for the Msg3.

In yet another embodiment, the early termination of Msg3 transmission is used. Upon determining that the Msg3 cannot be decoded correctly, the eNB triggers the early termination of Msg3 transmission such that the UE can restart the preamble transmission without trying the maximum number of Msg3 retransmission. In one embodiment, the eNB responds an ACK to a failed Msg3 to suspend the re-transmission of the Msg3. The eNB will not transmit the Msg4, which is the contention resolution after sending the ACK. The UE upon the expiration of the mac-ContentionResolutionTimer will perform a random backoff and pre-amble re-transmission. In another embodiment, the eNB sends a flag/indication to terminate/cancel the mac-ContentionResolutionTimer and terminate the Msg3 transmission so that the UE can enter the preamble retransmission stage. In one embodiment, the termination indication is embedded in the acknowledgement signaling. The three-bit acknowledge field can be used to indicate the cancellation of the mac-ContentionResolutionTimer and termination of the Msg3 transmission. In another embodiment, the termination flag is sent through PDCCH signaling. The UE monitors PDCCH while the mac-ContentionResolutionTimer is running. The eNB sends the termination flag in the PDCCH upon determining the Msg3 collision occurs. Upon receiving the termination flag, the UE cancels the mac-ContentionResolutionTimer and terminates the Msg3 retransmission procedure.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
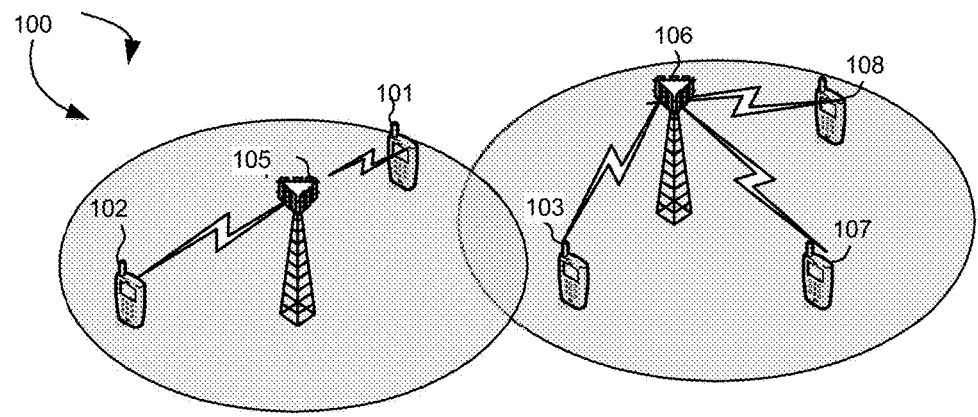
FIG. 1 illustrates an exemplary wireless network with LTE RACH procedure enhancement in accordance with embodiments of the current invention.
Figure 1:
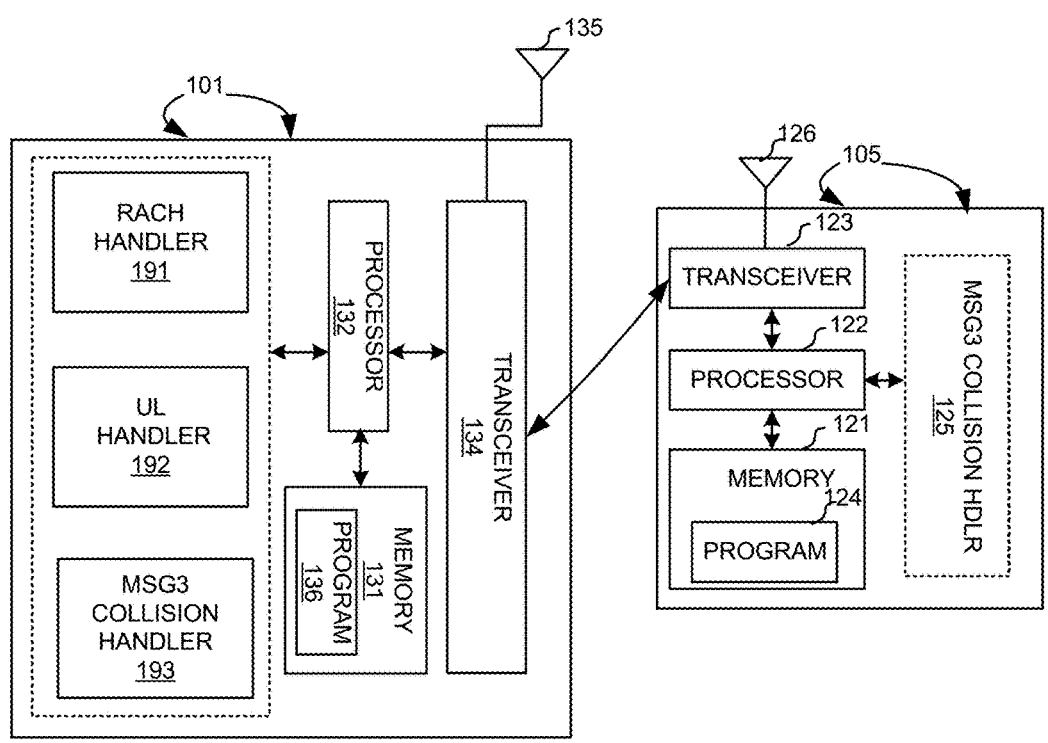

FIG. 1 illustrates an exemplary wireless network 100 with LTE RACH procedure enhancement in accordance with embodiments of the current invention. Wireless communications system 100 includes one or more wireless networks, and each of the wireless communication networks has fixed base infrastructure units, such as 105 and 106. The base units may also be referred to as an access point, an access terminal, a base station, eNB, or by other terminology used in the art. Each of the base stations 105 and 106 serves a geographic area. The geographic area served by wireless communications stations 105 and 106 overlaps in this example.

UEs 101 and 102 in the wireless network 100 are served by base station 105. Other UEs, such as UEs 103, 107 and 108, are served by a different base station 106. With the growing number of UEs in the system, the probability of the more than one UEs choosing the same preamble ID grows. If a preamble is transmitted by multiple devices, the eNB may detect the preamble. For example, if the timing of the multiple transmissions of the preamble is within cyclic prefix. Thus, the eNB cannot differentiate whether the preamble signals are from the different UEs or the same UE with the multi-path phenomenon. In another example, the timing of the multiple transmissions of the preamble is out of cyclic prefix. The eNB may know the preamble signals are from multiple devices. However, there is no way to differentiate it in Msg2. In both scenarios, the eNB treats the preamble being detected successfully and will response an RAR with RAPID by using RA-RNTI indicating the UL grant. The receiving UEs using the same RAPID will transmit the corresponding Msg3 in the same scheduled UL grant. Some problems may occur for multiple transmissions of Msg3 by different UEs in the same transport block.

First, there may by DMRS issues for the initial PUSCH scheduled by the RAR grant. DMRS in uplink transmission is used for channel estimation and for coherent demodulation, which comes along with PUSCH and PUCCH. For the DMRS for the initial PUSCH scheduled by RAR grant, all UEs will use the same seed, where the seed is related to cell ID and other parameters broadcasted in the system information, i.e., SIB2. The UE uses the seed to generate the pseudo-random sequence for the reference signal sequence. The reference signal will be transmitted by the UEs using the same preamble ID in Msg1 in the same resource block. Thus, when the eNB performs the channel estimation, it will see a composite channel from all transmitted UE. If the eNB applies the composite channel result to decode the UE specific Msg3 in PUSCH, with high probability, the PUSCH cannot be decoded correctly. If DMRS is bad or is not decoded properly by eNB, PUSCH or PUCCH will be not decoded as well.

Second, the multiple transmission of Msg3 in the same transport block may cause the Msg3 collision. When the preamble is detected by the eNB, the eNB will indicate a timing advance (TA) in RAR to a specific UE. All the UEs transmitting the same preamble ID and receiving the same RAR will apply this timing advance when transmitting their corresponding Msg3. Although the UEs' location may be different and when they apply the same TA, the timing of these Msg3 to eNB may be different. However, as long as the receiving of all Msg3 (TA and delay spread) is within the cyclic prefix length at the eNB, the eNB will treat these signals the same as multipath phenomena. Since these Msg3 messages carry different contents, they will severely interfere with each other. If eNB cannot successfully decode Msg3, it will transmit NACK to the UEs. The UEs receive the NACK will re-transmit their redundancy version of Msg3s. In such case, with high probability, the transmission and re-transmission of Msg3 may collide until the maximum number of MSG3 transmission is reached.

In one novel aspect, LTE RACH enhancement is disclosed to resolve the Msg3 collision problem. The solutions include DMRS randomization, MCS level indication for Msg3, and early termination of Msg3 transmission.

FIG. 1 further shows simplified block diagrams of UE 101 and base station 105 in accordance with the current invention.

Base station 105 has an antenna array 126 comprising one or more antennas, which transmit and receive radio signals. A RF transceiver module 123, coupled with the antenna, receives RF signals from antenna array 126, converts them to baseband signals and sends them to processor 122. RF transceiver 123 also converts received baseband signals from processor 122, converts them to RF signals, and sends out to antenna array 126. Processor 122 processes the received baseband signals and invokes different functional modules to perform features in base station 105. Memory 121 stores program instructions and data 124 to control the operations of base station 102. Base station 105 also includes a set of control modules, such as a Msg3 collision handler 125 that carries out functional tasks to configure, schedule, execute and communicate with the UE 101 for RACH enhancement related tasks such as handling of Msg3 collision.

UE 101 has an antenna array 135 with a single antenna, which transmits and receives radio signals. A RF transceiver module 134, coupled with the antenna, receives RF signals from antenna array 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. A RACH handler 191 sends a RACH preamble. An uplink (UL) handler 192 receives a uplink (UL) grant from the base station, wherein the UL grant includes a random access preamble identification (RAPID). A Msg3 collision handler 193 performs a Msg3 collision resolution procedure that terminates a Msg3 transmission or retransmission before a maximum number of Msg3 retransmission is reached.

Figure 2:
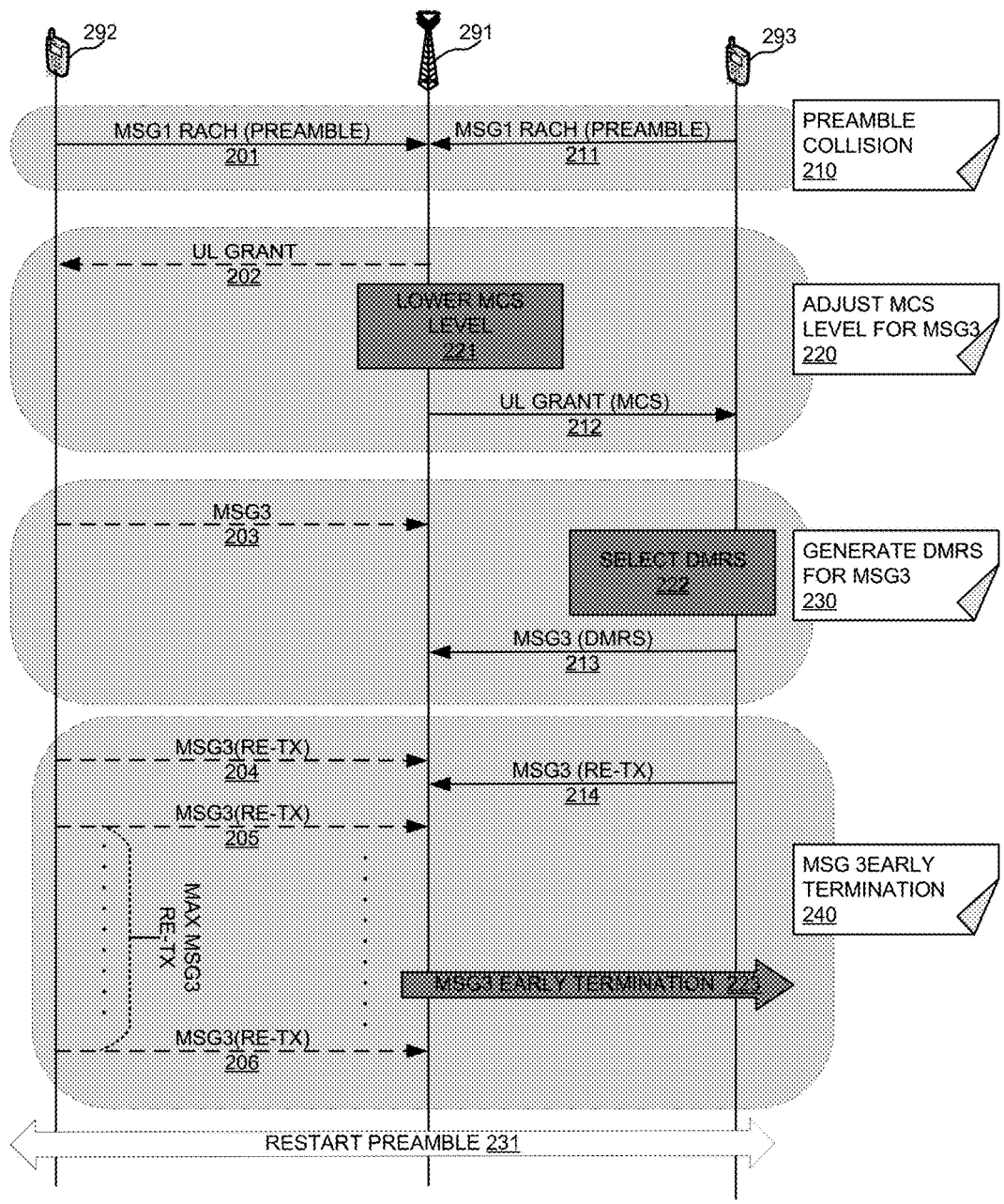
FIG. 2 illustrates an exemplary block diagram of different solutions for Msg3 collision problem in accordance with embodiments of the current invention.

FIG. 2 illustrates an exemplary block diagram of different solutions for Msg3 collision problem in accordance with embodiments of the current invention. An eNB 291 is connected with a UE 292, which does not include the Msg3 collision resolutions. eNB 291 also connects with a UE 293 that includes one or more solutions for the Msg3 collision problem. At step 201, UE 292 sends a Msg1 of RACH with a preamble ID. The preamble ID in step 201 collides with one or more other UEs in the system. eNB 291, at step 202, sends an UL grant to UE 291. The UL grant sent at step 202 includes the same RAPID as one or more other UL grants to different UEs. At step 203, UE 292 applies a DMRS generated by a cell-specific seed to a Msg3 and sent the Msg3 to eNB 291. Since the Msg3 at step 203 collides with one or more Msg3 messages from one or more other UEs, UE 292 will receive a NACK. At step 204, UE 292 re-transmits the Msg3. It is likely that the Msg3 at step 204 continues to collide with other Msg3 messages. UE 292 will receive a NACK. At step 205, UE 292 re transmits the Msg3. The re-transmission is likely to continue when UE 292 send Msg3 at step 206, which reached the maximum number of Msg3 retransmission. Since Msg3 at step 206 is not decoded correctly at eNB 291, the whole Msg3 transmission/retransmission procedure failed. UE 291, after the expiration of the mac-ContentionResolutionTimer, restarts the RACH preamble procedure.

Several solutions are provided for the Msg3 collision problem as illustrated by UE 293, including DMRS randomization, MCS level indication for Msg3, and early termination of Msg3 transmission.

In one embodiment 220, the MCS level for Msg3 is lowered to provide the robustness of the detection probability for the Msg3. At step 211, UE 293 sends a Msg1 of RACH with a preamble ID. The preamble ID in step 211 collides with one or more other UEs in the system. eNB 291 detects that multiple UEs were transmitting the same preamble and lowers the MCS level at step 221. eNB 291, at step 212, sends an UL grant to UE 293 indicating the lowered MCS level for the Msg3.

In another embodiment 230, the UE generates a DMRS using a randomly selected DMRS seed. At step 222, UE 293 generates a DMRS using DMRS seed different from the cell specific DMRS currently used. The DMRS seed is selected from a set of DMRS seeds. In one embodiment, the DMRS seed is randomly selected. UE 293 generates a DMRS based on the selected DMRS seed. UE 293 applies the DMRS to the Msg3 and sends the Msg3 to eNB 291 at step 213.

In yet another embodiment 240, the Msg3 retransmission is terminated early. At step 214, Msg3 is retransmitted. At step 223, eNB 291 terminates the retransmission of Msg3 before the maximum of Msg3 retransmission is reached. At step 231, UE 293 restarts the RACH preamble procedure.

The illustrated embodiments 210, 220, and 230 can be used alone or combined with one or more other embodiments.

Figure 3A:
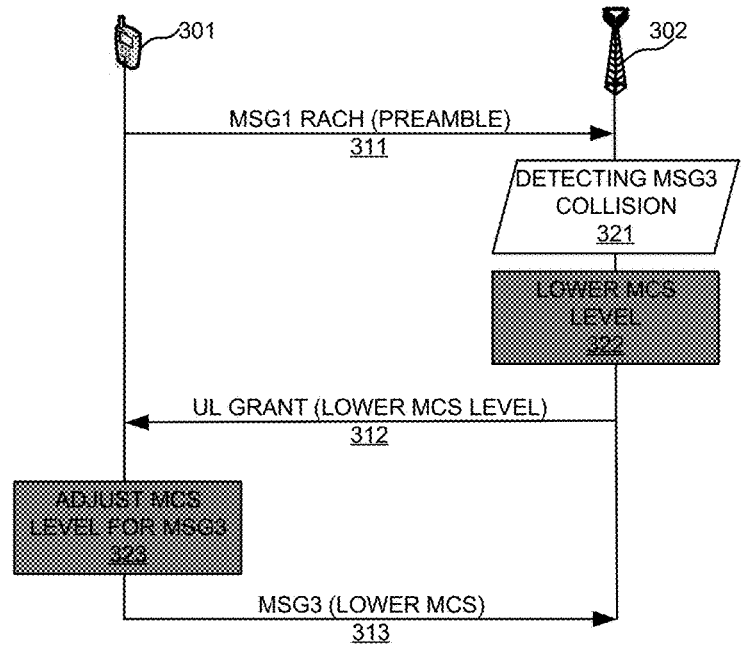
FIG. 3A illustrates an exemplary diagram of MCS level adjustment for Msg3 in accordance with embodiments of the current invention.

FIG. 3A illustrates an exemplary diagram of MCS level adjustment for Msg3 in accordance with embodiments of the current invention. A UE 301 connects with an eNB 302. In one embodiment, the eNB indicates MCS level for the Msg3 transmission in the RAR after preamble detection. For example, if eNB detects multiple UEs transmitted the same preamble no matter these preamble signals are within the CP or not, it can indicate lower MCS for the Msg3 transmission to enhance the Msg3 detection probability. At step 311, UE 301 sends a Msg1 of RACH with a preamble ID. At step 321, eNB 302 detects Msg3 collision. At step 322, eNB 302 sets the MCS level bits in the UL grant by lowering the MCS level for the Msg3. At step 312, eNB 302 sends the UL grant to UE 301 indicating MCS with a lower level. At step 323, UE 301 upon receiving the UL grant, adjust MCS level for the Msg3. At step 313, UE 301 sends the Msg3 to eNB 302 with the lowered MCS level.

Figure 3B:
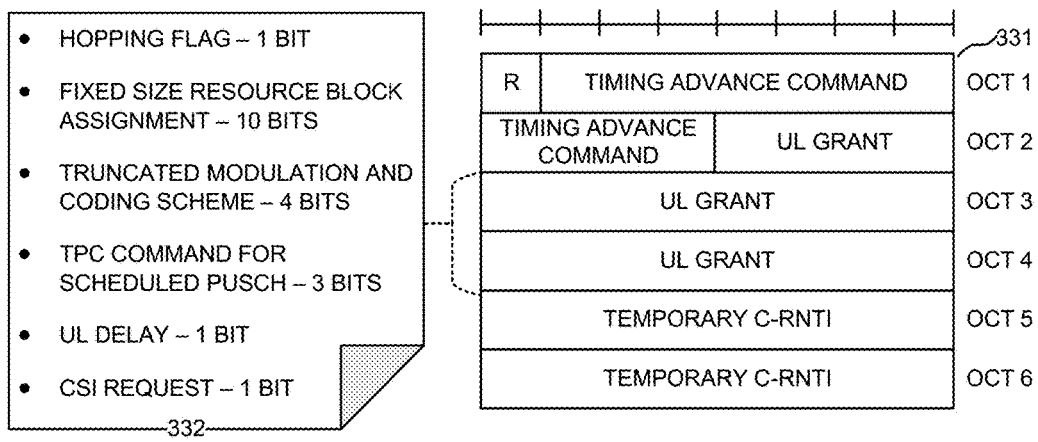
FIG. 3B illustrates an exemplary diagram of the UL grant for the Msg3 that includes the MCS level information in accordance with embodiments of the current invention.

FIG. 3B illustrates an exemplary diagram of the UL grant for the Msg3 that includes the MCS level information in accordance with embodiments of the current invention. In embodiment, The Msg3 MCS level can be indicated in the UL grant in MAC RAR message. Diagram 331 shows an exemplary MAC RAR format. At Oct3 and Oct4, the fields are reserved for UL. Diagram 332 shows the details of the UL grant contents. The higher layers indicate the 20-bit UL Grant to the physical layer. This is referred to the Random Access Response Grant in the physical layer. In particular, the truncated MCS are 4 bits. Diagram 332 shows the content of the 20 bits for UL grant. The hopping flag occupies one bit. The fixed-size resource block assignment occupies ten bits. The truncated MCS occupies four bits. The TPC command for scheduled PUSCH occupies three bits. The UL delay occupies one bit. The CSI request occupies one bit. The UE can use the four-bit MCS field to indicate a modified MCS level for its Msg3 transmission.

Figure 4A:
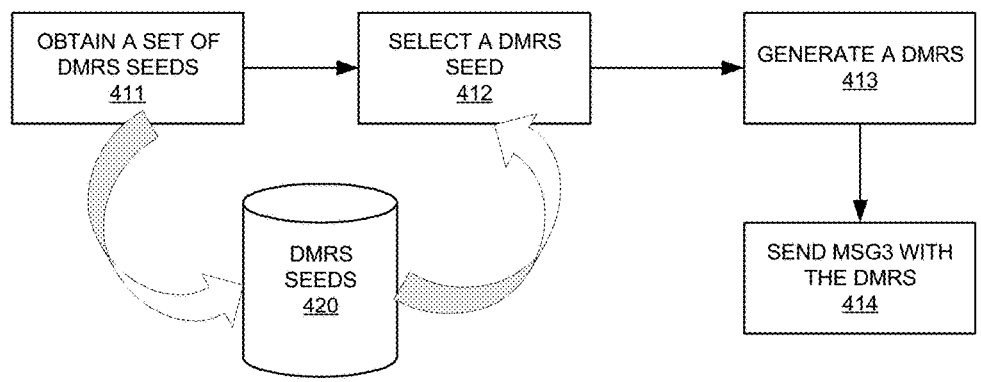
FIG. 4A illustrates an exemplary diagram for DMRS sequence generation in accordance with embodiments of the current invention.
Figure 4B:
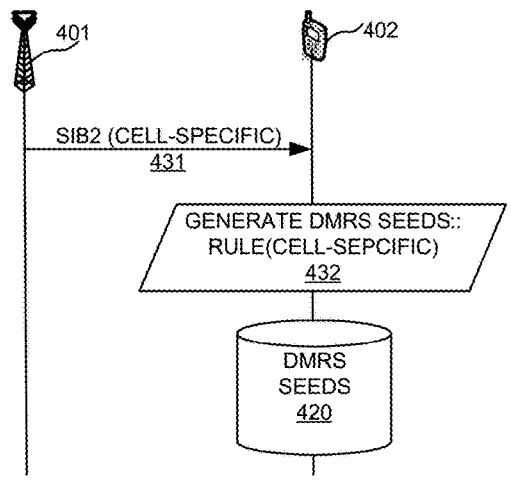
FIG. 4B illustrates an exemplary diagram for obtaining the set of DMRS seeds based on a cell-specific value from the network in accordance with embodiments of the current invention.
Figure 4C:
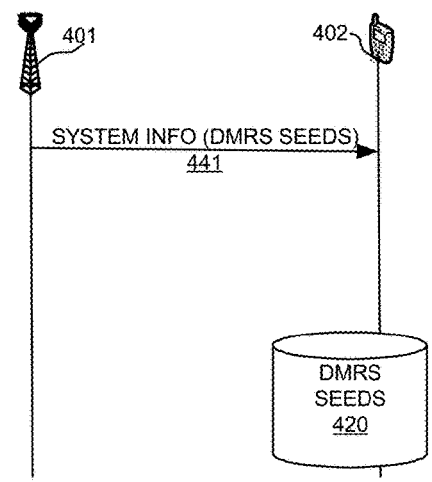
FIG. 4C illustrates an exemplary diagram for obtaining the set of DMRS seeds from the system information message in accordance with embodiments of the current invention.

In one embodiment, DMRS sequence generation is used to reduce the Msg3 collision. In order to reduce Msg3 collision probability, the network can provide a set of generation seeds of the DMRS for Msg3. The UEs transmitting their Msg3 can randomly choose a seed to generate its DMRS for the Msg3 transmission. In this way, even if multiple UEs transmit the same preamble, a further randomization of DMRS can be provided so that the probability of multiple UEs using the same DMRS can be reduced. Thus, eNB can estimate UE's channel by detecting individual DMRS. The Msg3 collision probability can be reduced. Besides, the DMRS detection complexity is acceptable because the eNB should only detect DMRS within a limited set. FIGS. 4A, 4B, and 4C illustrate the embodiments of DMRS sequence generation.

FIG. 4A illustrates an exemplary diagram for DMRS sequence generation in accordance with embodiments of the current invention. At step 411, the UE obtains a set of DMRS seeds 420. At step 412, the UE selects a DBMS seed from the set of DMRS seeds 420. At step 413, the UE generates a DMRS sequence based on the selected DMRS seed. At step 414, the UE sends the Msg3 using the generated DMRS sequence.

FIG. 4B illustrates an exemplary diagram for obtaining the set of DMRS seeds based on a cell-specific value from the network in accordance with embodiments of the current invention. The set of the DMRS generation seeds can follow a pre-defined rule to generate. For example, the eNB broadcasts a cell specific parameter in SIB2. UEs can use a pre-defined rule to generate the set of seeds and randomly pick up a seed to generate the DMRS. In the eNB side, eNB can use the pre-defined rule to detect the DMRS sequence. A UE 402 connects with an eNB 401. At step 431, eNB 401 sends a cell-specific parameter to UE 402. In one embodiment, the cell-specific parameter is sent in the SIB2 message. At step 432, UE 402 generates a set of DMRS seeds. In one embodiment, the set of DMRS seeds is generated based on the cell-specific parameter and a predefined rule. UE 402 maintains DMRS seeds 420.

FIG. 4C illustrates an exemplary diagram for obtaining the set of DMRS seeds from the system information message in accordance with embodiments of the current invention. In another embodiment, the set of DMRS generation seeds can be broadcasted in the system information. An UE 402 connects with eNB 401. At step 441, eNB 401 sends a set of DMRS to UE 402 using system information.

Figure 5A:
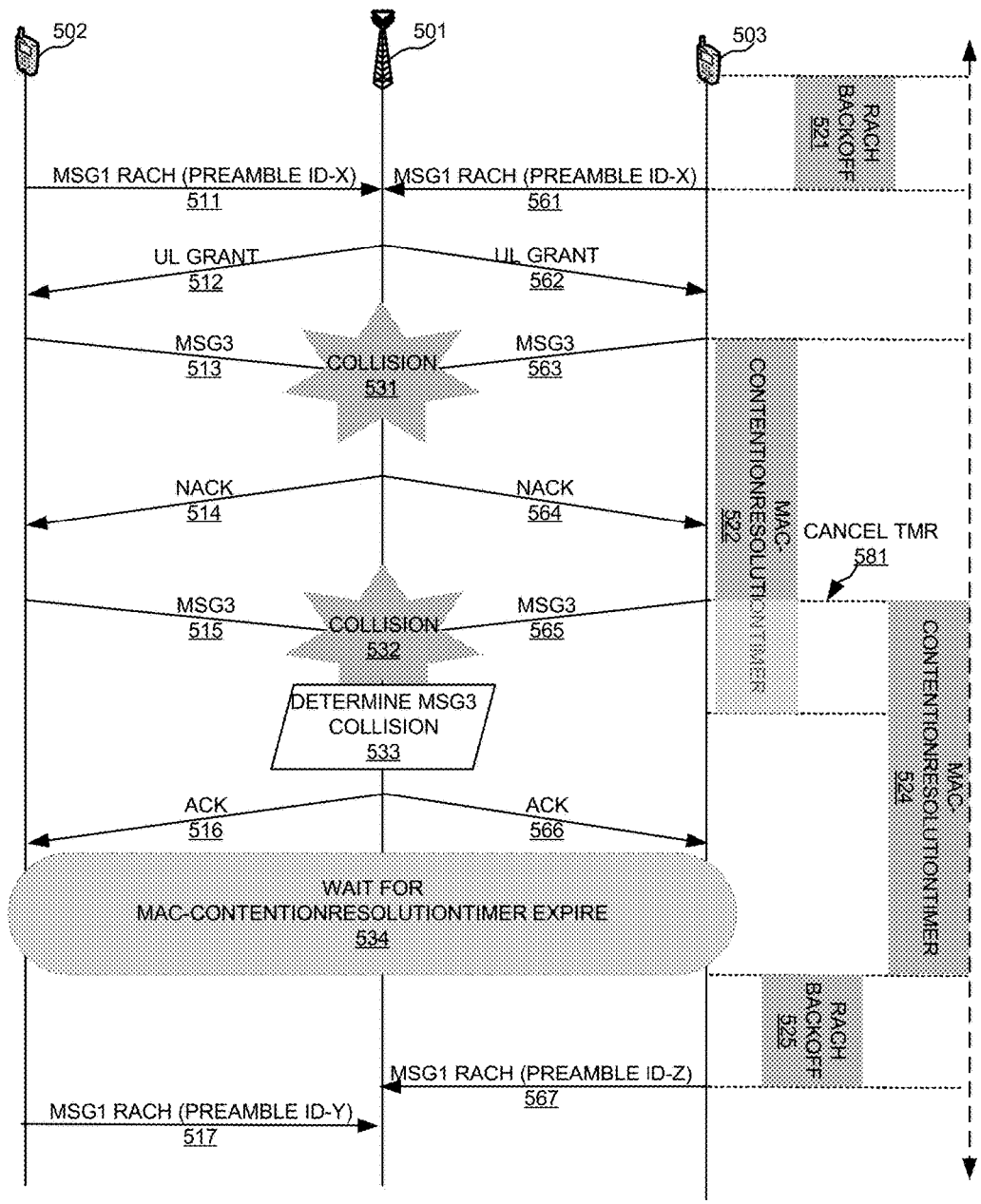
FIG. 5A illustrates an exemplary diagram for an early termination of Msg3 transmission without cancelling mac-ContentionResolutionTimer in accordance with embodiments of the current invention.
Figure 5B:
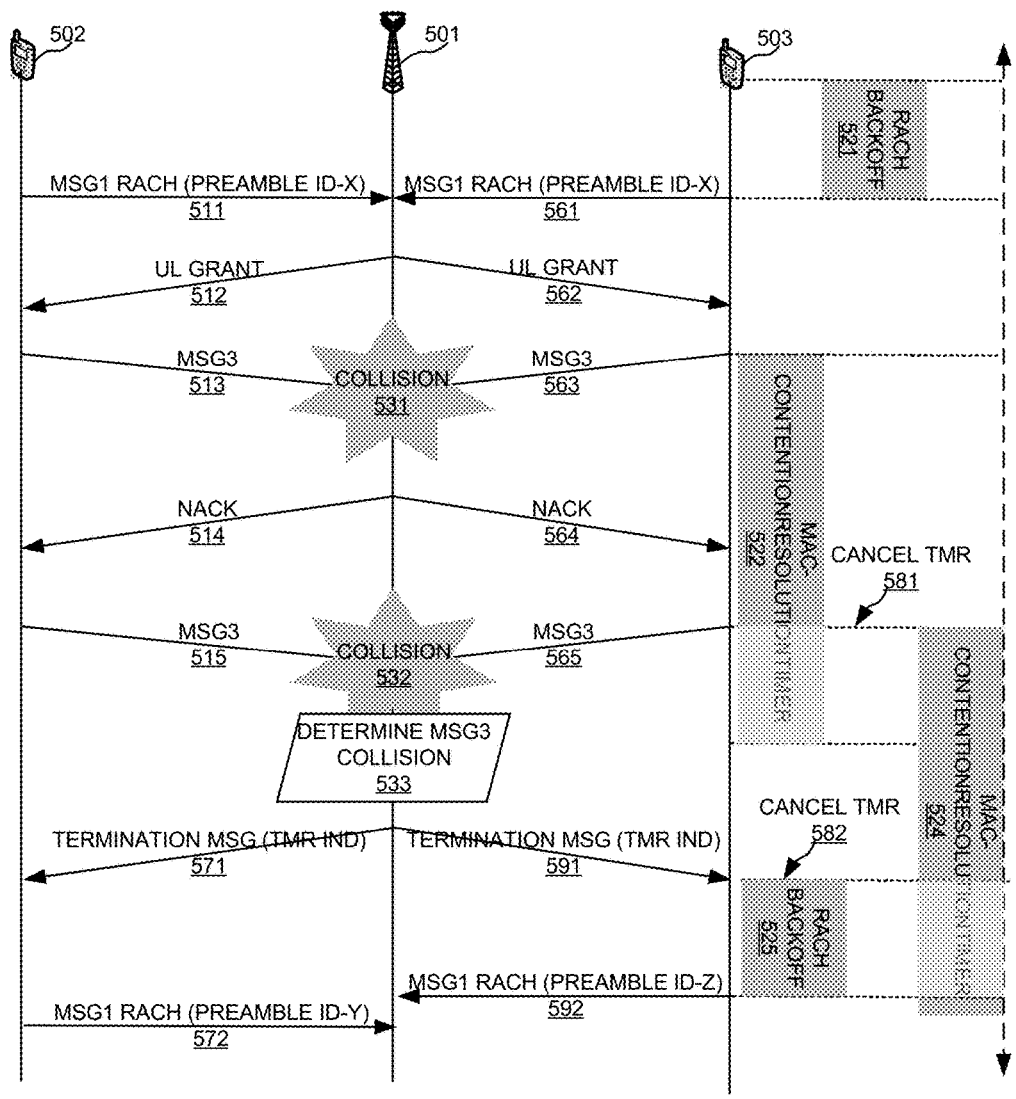
FIG. 5B illustrates an exemplary diagram for an early termination of Msg3 transmission with the cancellation of the mac-ContentionResolutionTimer in accordance with embodiments of the current invention.

In yet another embodiment, early termination of Msg3 transmission is an effective way to reduce the waste of natural resources. The maximum number of Msg3 retransmission is broadcasted in SIB2. It is between one and eight. When the eNB cannot decode Msg3 for multiple re-transmissions, it can trigger the early termination procedure of Msg3 transmissions. Once early termination is triggered, the UE can perform random backoff and preamble re-transmission earlier without trying Msg3 re-transmissions until the maximum number of Msg3 transmission reached. From the system perspective, it can save some UL resource for the Msg3 re-transmissions. From UE perspective, it can save some power for the Msg3 re-transmissions. The UE starts a mac-ContentionResolutionTimer each time the Msg3 is sent. In one embodiment of the early termination, the UE waits until the mac-ContentionResolutionTimer expires before triggering the random backoff and preamble retransmission. In another embodiment of the early termination, the UE cancels the mac-ContentionResolutionTimer and triggers the random backoff and preamble retransmission. FIGS. 5A and 5B illustrate the embodiments of the early termination procedures.

FIG. 5A illustrates an exemplary diagram for an early termination of Msg3 transmission without cancelling mac-ContentionResolutionTimer in accordance with embodiments of the current invention. A UE 502 and a UE 503 connect to an eNB 501. UEs start a RACH backoff period 521. At step 511, UE 502 sends a Msg1 of RACH with a preamble ID-X. At step 561, UE 503 sends a Ms1 of RACH with the same preamble ID-X. eNB 501 detects the Msg1 and sends an UL grant to UE 502 at step 512. eNB 501 also sends an UL grant with the same RAPID to UE 503 at step 562. Based on the received RAPID and its cell-specific DMRS, UE 502 sends a Msg3 at step 513. Similarly, based on the same received RAPID and its cell-specific DMRS, at step 563, UE 503 sends a Msg3. UE 502 and UE 503 start a mac-ContentionResolutionTimer 522 upon sending the Msg. At step 531, eNB 501 cannot decode the Msg3 from step 513 and step 563. At step 514, eNB 501 sends a NACK to UE 502. At step 564, eNB 501 sends a NACK UE 503. Upon receiving the NACK, UE 502 retransmits the Msg3 at step 515. UE 503 retransmits the Msg3 at step 565. At step 581, upon retransmitting the Msg3, UE 502 and UE 503 cancel mac-ContentionResolutionTimer 522 and start a new mac-ContentionResolutionTimer 524. At step 532, eNB 501 cannot decode the Msg3 from step 515 and step 565. At step 533, eNB 501 determines that there is a Msg3 collision. At step 516, eNB 501 triggers the Msg3 early termination to UE 502 by sending an ACK to UE 502. Similarly, at step 566, eNB 501 triggers the Msg3 early termination to UE 503 by sending an ACK to UE 503. The eNB will not transmit the Msg4, which is the contention resolution, after sending the ACK. The UE upon the expiration of the mac-ContentionResolutionTimer will perform a random backoff and preamble re-transmission. Upon the expiration of the mac-ContentionResolutionTimer, UE 502 starts a random backoff period. UE 503 starts a random backoff period 525 upon the expiration of the mac-ContentionResolutionTimer 524. At step 517, UE 502, upon the expiration of the random backoff period sends a Msg1 of RACH with a preamble ID-Y. Similarly, at step 567, UE 503, upon the expiration of the random backoff period 525 sends a Msg1 of RACH with a preamble ID-Z. Preamble ID-Y and preamble ID-Z may be the same or different.

FIG. 5B illustrates an exemplary diagram for an early termination of Msg3 transmission with the cancellation of the mac-ContentionResolutionTimer in accordance with embodiments of the current invention. In one embodiment, the Msg3 early termination procedure also indicates the cancellation of the mac-ContentionResolutionTimer so that the UE can start the RACH random backoff period without waiting.

A UE 502 and a UE 503 connect to an eNB 501. UEs start a RACH backoff period 521. At step 511, UE 502 sends a Msg1 of RACH with a preamble ID-X. At step 561, UE 503 sends a Msg1 of RACH with the same preamble ID-X. eNB 501 detects the Msg1 and sends an UL grant to UE 502 at step 512. eNB 501 also sends an UL grant with the same RAPID to UE 503 at step 562. Based on the received RAPID and its cell-specific DMRS, UE 502 sends a Msg3 at step 513. Similarly, based on the same received RAPID and its cell-specific DMRS, at step 563, UE 503 sends a Msg3. UE 502 and UE 503 start a mac-ContentionResolutionTimer 522 upon sending the Msg. At step 531, eNB 501 cannot decode the Msg3 from step 513 and step 563. At step 514, eNB 501 sends a NACK to UE 502. At step 564, eNB 501 sends a NACK UE 503. Upon receiving the NACK, UE 502 retransmits the Msg3 at step 515. UE 503 retransmits the Msg3 at step 565. At step 581, upon retransmitting the Msg3, UE 502 and UE 503 cancel mac-ContentionResolutionTimer 522 and start a new mac-ContentionResolutionTimer 524. At step 532, eNB 501 cannot decode the Msg3 from step 515 and step 565. At step 533, eNB 501 determines that there is a Msg3 collision. In one embodiment, the Msg3 early termination procedure cancels the mac-ContentionResolutionTimer as well. At step 571, eNB 501 sends a termination message to UE 502 with the indication to cancel the mac-ContentionResolutionTimer. Similarly, at step 591, eNB 501 sends a termination message to UE 503 with the indication to cancel the mac-ContentionResolutionTimer.

In one embodiment, the termination messages of steps 571 and 591 are the acknowledgement. In the current mechanism, each acknowledgement is represented by a bit string of three bits: "000" for a negative acknowledgement and "111" for a positive acknowledgement. The acknowledgement is modulated using BPSK to generate three modulation symbols. These modulation symbols are then spread using the appropriate orthogonal sequence. The mac-ContentionResolutionTimer termination flag can be embedded in the ACK/NACK three-bit strings. For example, "001"

represents negative acknowledgement for Msg3 with an early termination of mac-ContentionResolutionTimer indication.

In another embodiment, the termination messages of steps 571 and 591 are embedded in a physical downlink control channel (PDCCH) signaling. After Msg3 is transmitted, the UE needs to monitor PDCCH when the mac-ContentionResolutionTimer is running. The early termination flag is carried by a PDCCH signaling. The PDCCH signaling can be scrambled by the TC-RNTI indicating in the random access response (RAR). Therefore, for the UE performs RACH in the RRC connected state, in addition to using C-RNTI to de-scrambled the PDCCH signaling, it should also try TC-RNTI indicated in the RAR to de-scramble the PDCCH. Once if UE decodes the mac-ContentionResoultionTimer termination flag, it stops transmit its Msg3 and terminates its running mac-ContentionResoultionTimer.

Once the UE detects the Msg3 termination indication in either the acknowledgement or in the PDCCH signaling, it stops transmit its Msg3 and terminates its running mac-ContentionResolutionTimer. Then, the UE performs random backoff and re-transmits the preamble. At step 582, UE 502 and UE 503 cancel the mac-ContentionResolutionTimer and start a RACH random backoff period. At step 572, upon the expiration of the RACH random backoff period, UE 502 sends Msg1 of the RACH with a preamble ID-Y. At step 592, upon the expiration of the RACH random backoff period 525, UE 503 sends Msg1 of the RACH with a preamble ID-Z. Preamble ID-Y and preamble ID-Z may be the same or different.

Figure 6:
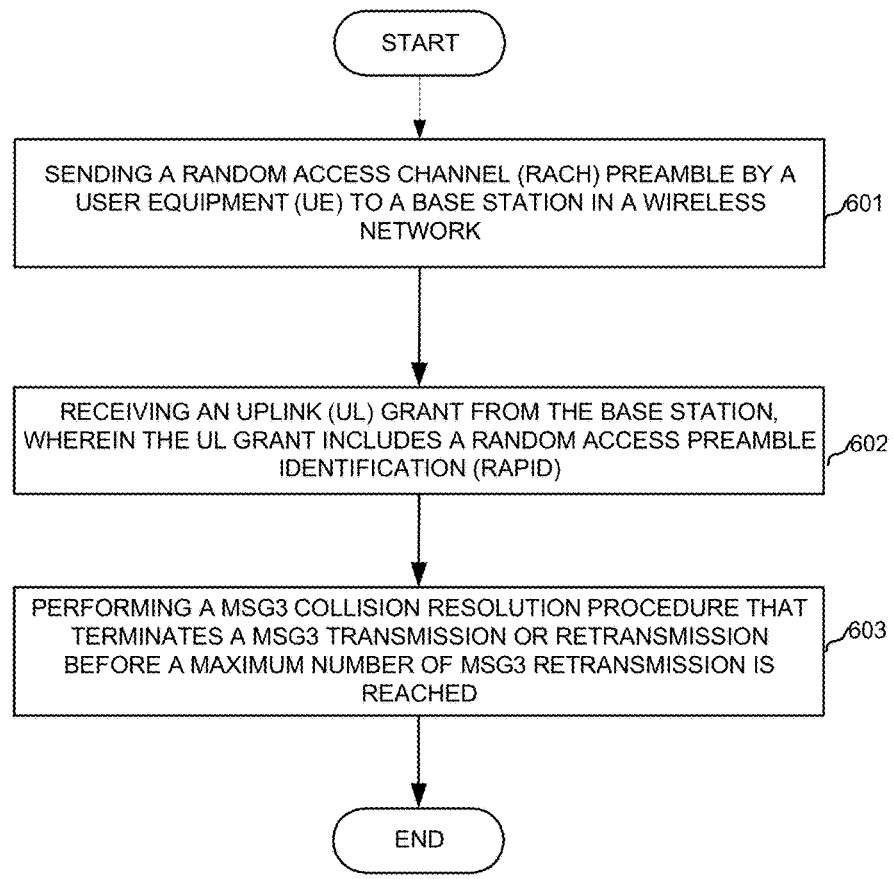
FIG. 6 is an exemplary flow chart for the UE to perform the Msg3 collision resolution procedure in accordance with embodiments of the current invention.

FIG. 6 is an exemplary flow chart for the UE to perform the Msg3 collision resolution procedure in accordance with embodiments of the current invention. At step 601, the UE sends a random access channel (RACH) preamble to a base station in a wireless network. At step 602, the UE receives an uplink (UL) grant from the base station, wherein the UL grant includes a random access preamble identification (RAPID). At step 703, the UE performs a Msg3 collision resolution procedure that terminates a Msg3 transmission or retransmission before a maximum number of Msg3 retransmission is reached.

Figure 7:
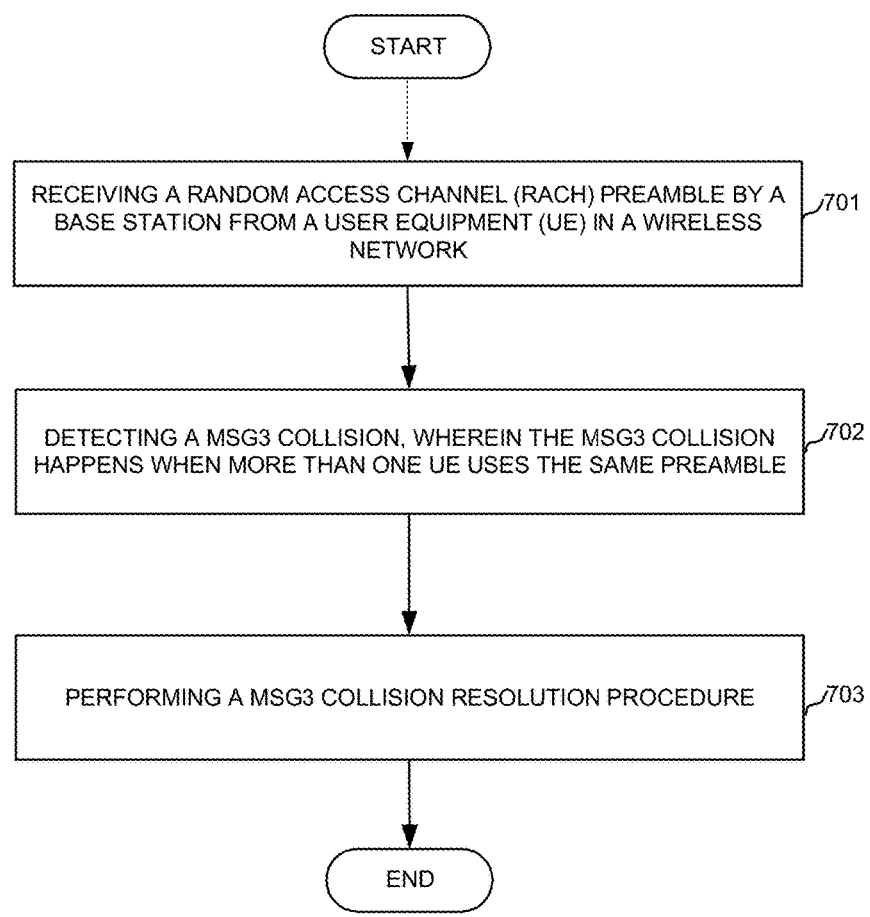
FIG. 7 is an exemplary flow chart for the eNB to perform the Msg3 collision resolution procedure in accordance with embodiments of the current invention.

FIG. 7 is an exemplary flow chart for the eNB to perform the Msg3 collision resolution procedure in accordance with embodiments of the current invention. At step 701, the eNB receives a random access channel (RACH) preamble from a user equipment (UE) in a wireless network. At step 702, the eNB detects a Msg3 collision, wherein the Msg3 collision happens when more than one UE uses the same preamble. At step 703, the eNB performs a Msg3 collision resolution procedure.

In another novel aspect, a contention-based Msg3 transmission is used. The contention-based Msg3 transmission skips the preamble transmission and directly sends Msg3 with data. The Msg3 randomly pick resources from a set of pre-allocated contention resources. All the methods disclosed above apply to the contention-based Msg3 transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
sending a random access channel (RACH) preamble by a user equipment (UE) to a base station in a wireless network;
receiving an uplink (UL) grant from the base station, wherein the UL grant includes a random access preamble identification (RAPID);
receiving one or more Msg3 collision resolution signal from the base station when the Msg3 is not decoded correctly at the base station, wherein the Msg3 collision resolution signal is selected from a signal set comprising a set of demodulation reference signal (DMRS) seeds, a Msg3 ACK for a failed Msg3 decoding at the base station, and a mac-ContentionResolutionTimer termination indicator;
performing one or more Msg3 collision resolution procedures based on the received one or more Msg3 collision resolution signal when the Msg3 was not decoded correctly by the base station, and wherein the Msg3 collision resolution terminates a Msg3 transmission or retransmission before a maximum number of Msg3 retransmission is reached and before an expiration of a mac-ContentionResolutionTimer.

2. The method of claim 1, wherein the Msg3 collision resolution signal is a set of DMRS seeds, and wherein the Msg3 collision resolution procedure involves:
obtaining a set of demodulation reference signal (DMRS) seeds;
selecting a transmission DMRS seed from the set of DMRS seeds;
generating a DMRS using the selected transmission DMRS seed; and
sending a message-3 using the generated DMRS.

3. The method of claim 2, wherein the obtaining the set of DMRS seeds comprising:
receiving a cell-specific parameter from the wireless network in a SIB2; and
generating the set of DMRS seeds based on a pre-defined rule and the received cell-specific parameter.

4. The method of claim 2, wherein the obtaining the set of DMRS seeds involves: receiving the set of DMRS seeds from a broadcast system information message.

5. The method of claim 1, wherein the Msg3 collision resolution signal is the mac-Contention ResolutionTimer termination indicator, and wherein the Msg3 collision resolution procedure involves:
receiving the mac-Contention ResolutionTimer termination indicator from the base station;
stopping the mac-Contention ResolutionTimer;
terminating the retransmission of the Msg3; and
starting a backoff period for a retransmission of a RACH preamble.

6. The method of claim 5, wherein the termination indicator is embedded in an ACK/NACK signaling.

7. The method of claim 5, wherein the termination indicator is embedded in a physical downlink control channel (PDCCH) signaling.

8. A method, comprising:
receiving a random access channel (RACH) preamble by a base station from a user equipment (UE) in a wireless network;
detecting a Msg3 collision, wherein the Msg3 collision happens when more than one UE uses the same preamble;
sending one or more Msg3 collision resolution signal by the base station upon detecting the Msg3 collision, wherein the Msg3 collision resolution signal is selected from a signal set comprising a set of demodulation reference signal (DMRS) seeds, a Msg3 ACK for a failed Msg3 decoding at the base station, and a mac-ContentionResolutionTimer termination indicator; and performing a Msg3 collision resolution procedure before receiving a maximum number of Msg3 retransmission, wherein the Msg3 collision resolution procedure terminates the UE's current Msg3 transmission or retransmission before a maximum number of Msg3 retransmission is reached and before an expiration of a mac-Contention ResolutionTimer.

9. The method of claim 8, wherein the Msg3 collision resolution procedure involves: sending an uplink (UL) grant to the UE by the base station, wherein the UL grant indicates a lower modulation and coding scheme (MCS) level than a MCS level in the received Msg3.

10. The method of claim 8, wherein the Msg3 collision resolution procedure involves:

transmitting a set of demodulation reference signal (DMRS) seeds to the UE, wherein a DMRS for a Msg3 from the UE is generated based on a randomly selected DMRS seed selected from the set of DMRS seeds.

11. The method of claim 10, wherein the termination of the Msg3 retransmission is embedded in a physical downlink control channel (PDCCH) signaling.

12. An apparatus, comprising:

a radio frequency (RF) transceiver that transmits and receives radio signals in a wireless network;

a random access channel (RACH) circuit that sends a RACH preamble;

a uplink (UL) circuit that receives a uplink (UL) grant from a base station, wherein the UL grant includes a random access preamble identification (RAPID);

a Msg3 collision signal circuit that receives one or more Msg3 collision resolution signal from the base station when the Msg3 is not decoded correctly at the base station, wherein the Msg3 collision resolution signal is selected from a signal set comprising a set of demodulation reference signal (DMRS) seeds, a Msg3 ACK for a failed Msg3 decoding at the base station, and a mac-ContentionResolutionTimer termination indicator; and a Msg3 collision circuit that performs a Msg3 collision resolution procedure that terminates a Msg3 transmission or retransmission before a maximum number of Msg3 retransmission is reached and before an expiration of a mac-ContentionResolutionTimer.

13. The apparatus of claim 12, wherein the Msg3 collision circuit further obtains a set of demodulation reference signal (DMRS) seeds, selects a transmission DMRS seed from the set of DMRS seeds, generates a DMRS using the selected transmission DMRS seed, and sends a message-3 using the generated DMRS.

14. The apparatus of claim 13, wherein the obtaining the set of DMRS seeds comprising:

receiving a cell-specific parameter from the wireless network in a SIB2; and generating the set of DMRS seeds based on a pre-defined rule and the received cell-specific parameter.

15. The apparatus of claim 13, wherein the obtaining the set of DMRS seeds involves: receiving the set of DMRS seeds from a broadcast system information message.

16. The apparatus of claim 12, wherein the Msg3 collision circuit further receives a mac-Contention ResolutionTimer termination indicator from the base station, stops the mac-ContentionResolutionTimer, terminates the retransmission of the Msg3, and starts a backoff period for a retransmission of a RACH preamble.

17. The apparatus of claim 16, wherein the termination indicator is embedded in an ACK/NACK signaling.

18. The apparatus of claim 16, wherein the termination indicator is embedded in a physical downlink control channel (PDCCH) signaling.

19. The method of claim 1, wherein the Msg3 collision resolution signal is a Msg3 ACK for a failed Msg3 decoding at the base station, and wherein the Msg3 collision resolution procedure involves:

receiving an ACK from the base station for a Msg3 transmitted, wherein the ACK is sent when the Msg3 failed to be decoded at the base station;

detecting an expiration of a mac-ContentionResolutionTimer; and starting a back off period for a retransmission of a RACH preamble.

20. The method of claim 8, wherein Msg3 collision resolution procedure involves sending a Msg3 ACK to the UE when the Msg3 is not decoded correctly.

21. The apparatus of claim 12, wherein the Msg3 collision circuit further receives an ACK from the base station for a Msg3 transmitted, and wherein the ACK is sent when the Msg3 failed to be decoded at the base station, detects an expiration of a mac-ContentionResolutionTimer, and wherein the Msg3 collision circuit starts a back off period for a retransmission of a RACH preamble.

* * * * *